(No Model.)
C. G. NERGER.
MILK COOLER.
No. 490,398. Patented Jan. 24, 1893.
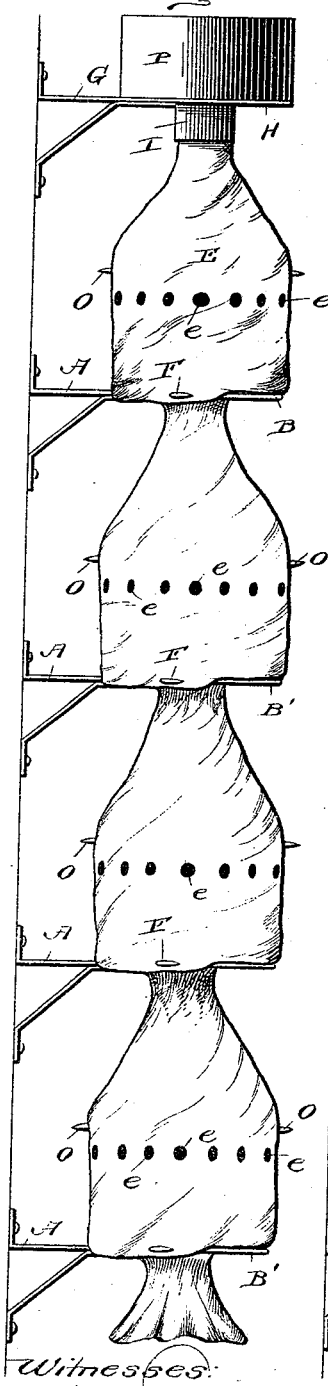
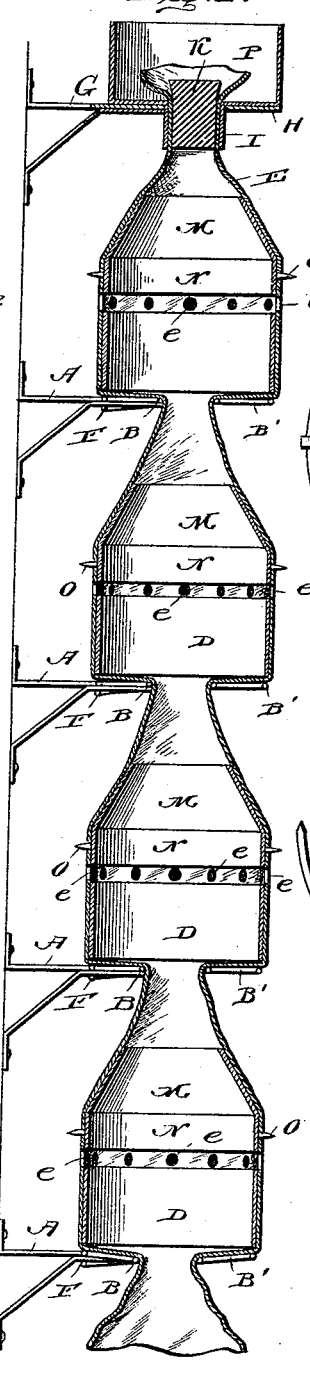
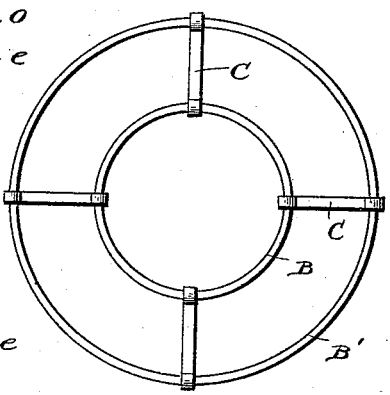
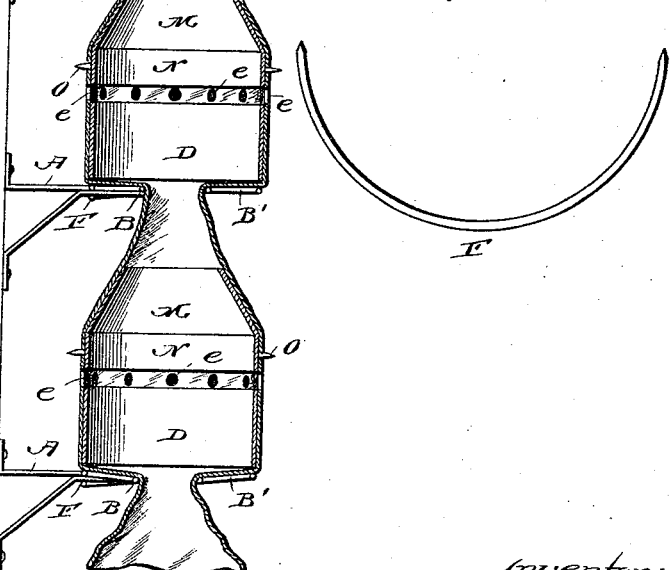
Inventor:
Chas. G. Nerger.
By Edson Bros
Atty's.
Witnesses:

UNITED STATES PATENT OFFICE.

CHARLES G. NERGER, OF ABILENE, TEXAS.

MILK-COOLER.

SPECIFICATION forming part of Letters Patent No. 490,398, dated January 24, 1893.

Application filed October 1, 1892. Serial No. 447,549. (No model.)

*To all whom it may concern:*

Be it known that I, CHARLES G. NERGER, a citizen of the United States, residing at Abilene, in the county of Taylor and State of Texas, have invented certain new and useful Improvements in Milk-Coolers; and I do hereby declare the following to be a full, clear, and exact description of the invention, such as will enable others skilled in the art to which it appertains to make and use the same.

My invention relates to improvements in apparatus for cooling milk and it consists in the combination with a vessel adapted to contain any desired quantity of milk, of a cloth or fabric covering inclosing said milk receiving vessel and provided at an intermediate portion of its length with a series of openings or perforations, and means for saturating said inclosing cloth with water.

My invention further consists in the peculiar construction and arrangement of parts as will be hereinafter fully pointed out and claimed.

In the accompanying drawings—Figure 1 is a side elevation of my improved milk cooling apparatus; Fig. 2 is a vertical sectional view of the same; Fig. 3 is a detail view of the supports for one of the milk receiving vessels, and Fig. 4 is a detail view of one of the securing pins.

Like letters of reference denote corresponding parts in the several figures of the drawings, referring to which—

A designates a series of brackets which are adapted to be rigidly attached to a wall or any suitable support and on each of said brackets, at the outer free end thereof, is arranged a support consisting of two concentric rings B, B', firmly attached together by means of a series of radial arms C and said connected concentric rings are firmly secured on the brackets A in any desirable and suitable manner.

On each of the brackets A, of which any desired number may be employed, is arranged an open top vessel D, of any desired size and form, designed to receive fresh warm milk.

The milk receiving vessels D are inclosed and completely surrounded by a textile or fabric covering E. The covering E extends around the vessel D and under each of said vessels through the smaller inner ring B of the concentric rings carried by the brackets A as shown in Fig. 1. The covering or sheath E is held in place and prevented from being drawn out of the rings B by means of securing pins F, preferably made in the form shown in Fig. 4 in which they are made of a single piece of spring metal curved and pointed at both ends. The pins are arranged below the rings B, B', attached to each of the brackets A and said pins engage with portions of the covering or sheath E, which are drawn down around the outer ring B' on each support or bracket A.

Above the upper bracket A is arranged another bracket G provided at its outer end with a flat supporting plate H. On the plate H rests a tank or receptacle P provided with a central depending tube I which extends downwardly through the plate H. The upper end of the fabric sheath E extends up through the tube I and is held in place by a stopper or plug K as shown in Fig. 2; and said fabric sheath or covering E is provided at intermediate points of its length with a series of apertures or openings e through which the air can freely pass and said apertures or openings are arranged in a band just above the upper open end of each of the milk receiving vessels D.

If desired instead of making the sheath or covering E in one continuous piece and perforating or puncturing the same, as hereinbefore described, said sheath may be composed of a series of sections connected together by bands of coarse or large meshed material which bands will lie just above the upper ends of the vessels D.

Within the sheath E, above each of the vessels D therein, is arranged a drip cone M. Each drip cone is provided at its lower edge with a depending flange N to which are firmly attached, or formed integral therewith, a series of laterally projecting spurs or pins O which pins penetrate the solid portion of the sheath E, above the perforated or punctured portion thereof, and hold the drip cone firmly in place.

The operation of my invention may be briefly stated as follows:—Any or all of the vessels D are filled with fresh warm milk and the tank or vessel P is filled with cool water. The upper ends of the fabric sheath or covering E are saturated with the water which spreads throughout the entire body of said covering. At the perforated or apertured portion of the sheath the moisture will form in drops as it passes across said openings and the air passing therethrough and over the milk in the vessels D will be cooled and carry off the heat of the milk. A suitable vessel can be placed below the apparatus to catch the drippings therefrom and the quantity of water allowed to enter the cloth can be regulated by raising or depressing the plug K. The drip cones hold the fabric sheath away from the vessel D slightly in order that there will be no danger of any of the water falling into the milk contained in said vessels.

From the foregoing description and the drawings it will be seen that I have provided a simple and compact apparatus by means of which milk can be easily and quickly cooled. The milk receiving vessels and drip cones can be easily removed from the sheath or covering E for the purpose of being cleaned &c.

I am aware that changes in the form and proportion of parts and details of construction of the devices herein shown and described as an embodiment of my invention can be made without departing from the spirit or sacrificing the advantages thereof, and I therefore reserve the right to make such changes as fairly fall within the scope of the same.

Having thus fully described my invention, what I claim as new and desire to secure by Letters Patent, is:—

1. The combination of a milk receptacle, a water vessel and a fabric sheath or covering having one end entering the water vessel and completely surrounding the milk receiving vessel, said covering being provided above the milk receptacle with a series of perforations or openings, substantially as and for the purpose described.

2. The combination of a milk receptacle, a water vessel arranged above the milk receptacle and provided with an opening in its bottom, a fabric sheath extending up through the opening in the water vessel and down around the milk receptacle and a plug fitted in the opening in the bottom of the water vessel and holding the fabric sheath in place therein, substantially as described.

3. The combination of a bracket provided at its outer end with a support having a central opening or aperture, a water vessel, a fabric sheath extending through the opening in the support on the bracket and having one end entering the water vessel and a milk receptacle arranged within the fabric sheath, substantially as described.

4. The combination of a milk receptacle, a water vessel, a fabric sheath surrounding the milk receptacle and having one end entering the water vessel, said sheath being provided with a series of perforations and a drip cone arranged within the fabric sheath, substantially as described.

5. The combination of a milk receptacle, a water vessel, a fabric sheath, surrounding the milk receptacle and provided with a series of perforations, and having one end entering the water vessel and a drip cone arranged within the fabric sheath and provided with a series of laterally projecting spurs or pins, substantially as described.

6. The combination of a series of supports, each provided with an opening or aperture, a water vessel, a fabric sheath having one end secured in the water vessel and extending through the aligned openings in the supports, said fabric being provided, at intermediate portions of its length with a series of perforations, a series of milk receptacles arranged within the fabric sheath above each support and a drip cone arranged within the fabric sheath above each milk receptacle, substantially as described.

In testimony whereof I affix my signature in presence of two witnesses.

CHARLES G. NERGER.

Witnesses:
H. A. PORTER,
A. H. KIRBY.